US012601964B2

(12) United States Patent
Kitahara et al.

(10) Patent No.: US 12,601,964 B2
(45) Date of Patent: Apr. 14, 2026

(54) LIGHT SOURCE DEVICE AND DISPLAY DEVICE

(71) Applicant: NICHIA CORPORATION, Anan (JP)

(72) Inventors: Wataru Kitahara, Kamiina-gun (JP); Takanori Aruga, Suwa-gun (JP)

(73) Assignee: Nichia Corporation, Anan (JP)

( * ) Notice: Subject to any disclaimer, the term of this patent is extended or adjusted under 35 U.S.C. 154(b) by 427 days.

(21) Appl. No.: 18/299,417

(22) Filed: Apr. 12, 2023

(65) Prior Publication Data

US 2023/0367189 A1 Nov. 16, 2023

(30) Foreign Application Priority Data

May 13, 2022 (JP) ................................. 2022-079262

(51) Int. Cl.
*G03B 21/20* (2006.01)
*G03B 21/28* (2006.01)

(52) U.S. Cl.
CPC ..... *G03B 21/2013* (2013.01); *G03B 21/2033* (2013.01); *G03B 21/28* (2013.01)

(58) Field of Classification Search
CPC ............... G03B 21/2013; G03B 21/28; G02B 21/2033; G02B 27/1006; G02B 27/141
USPC ........................................................ 353/99
See application file for complete search history.

(56) References Cited

U.S. PATENT DOCUMENTS

| | | | |
|---|---|---|---|
| 9,304,323 B2 * | 4/2016 | Khrushchev | .......... G03B 21/28 |
| 2011/0187998 A1 | 8/2011 | Kimura et al. | |
| 2013/0188146 A1 * | 7/2013 | DeCusatis | ............ H04N 13/365 |
| | | | 353/7 |
| 2014/0354956 A1 | 12/2014 | Yamada et al. | |
| 2016/0062224 A1 | 3/2016 | Nagahara et al. | |
| 2020/0301156 A1 | 9/2020 | Nagahara | |
| 2021/0405517 A1 | 12/2021 | Tanaka | |

FOREIGN PATENT DOCUMENTS

| | | |
|---|---|---|
| JP | 2008-003125 A | 1/2008 |
| JP | 2011-158502 A | 8/2011 |
| JP | 2016-051603 A | 4/2016 |
| JP | 2020-154209 A | 9/2020 |
| JP | 2021-135333 A | 9/2021 |
| JP | 2022-022509 A | 2/2022 |
| WO | 2013/105546 A1 | 7/2013 |

* cited by examiner

*Primary Examiner* — Jerry L Brooks
(74) *Attorney, Agent, or Firm* — Kim & Stewart LLP

(57) ABSTRACT

The light source includes first to eighth light sources configured to emit first to eighth lights, respectively. The first light has a first peak wavelength, the second light has a second peak wavelength, the third light has a third peak wavelength, and the fourth light has the second peak wavelength. The fifth light has the third wavelength, the sixth light has the second wavelength, the seventh light has the first wavelength, and the eighth light has the second wavelength. The first and fifth lights pass through a first optical member. The second and sixth lights pass through a second optical member. The third and seventh lights are reflected by the second optical member. The fourth and eighth lights are reflected by the first optical member.

18 Claims, 15 Drawing Sheets

11L

17L 13L  15L    16L    12L 18L    14L

LIGHT SOURCE DEVICE AND DISPLAY DEVICE

CROSS-REFERENCE TO RELATED APPLICATION

This application claims priority to Japanese Patent Application No. 2022-079262, filed on May 13, 2022, the entire contents of which are hereby incorporated by reference.

BACKGROUND

Technical Field

The present disclosure relates to a light source device and a display device.

Background Art

Light source devices are used in display devices such as projectors. Such light source devices are desired to have a uniform illuminance distribution (for example, see Japanese Patent Publication No. 2008-003125).

SUMMARY

According to certain embodiments of the present invention, a light source device and a display device with improved illuminance distribution can be provided in which the speckles can be reduced.

According to an embodiment of the present invention, a light source device includes a first optical member, a second optical member, and first to eighth light sources. The first light source is configured to emit first laser light of a first peak wavelength. The second light source is configured to emit second laser light of a second peak wavelength different from the first peak wavelength. The third light source is configured to emit third laser light of a third peak wavelength different from the first peak wavelength and the second peak wavelength. The fourth light source is configured to emit fourth laser light of the second peak wavelength. The fifth light source is configured to emit fifth laser light of the third peak wavelength. The sixth light source is configured to emit sixth laser light of the second peak wavelength. The seventh light source is configured to emit seventh laser light of the first peak wavelength. The eighth light source is configured to emit eighth laser light of the second peak wavelength. The first and fifth laser lights pass through the first optical member. The second and sixth laser lights pass through the second optical member. The third and seventh laser lights are reflected by the second optical member. The fourth and eighth laser lights are reflected by the first optical member.

DETAILED DESCRIPTION

Figure 1:
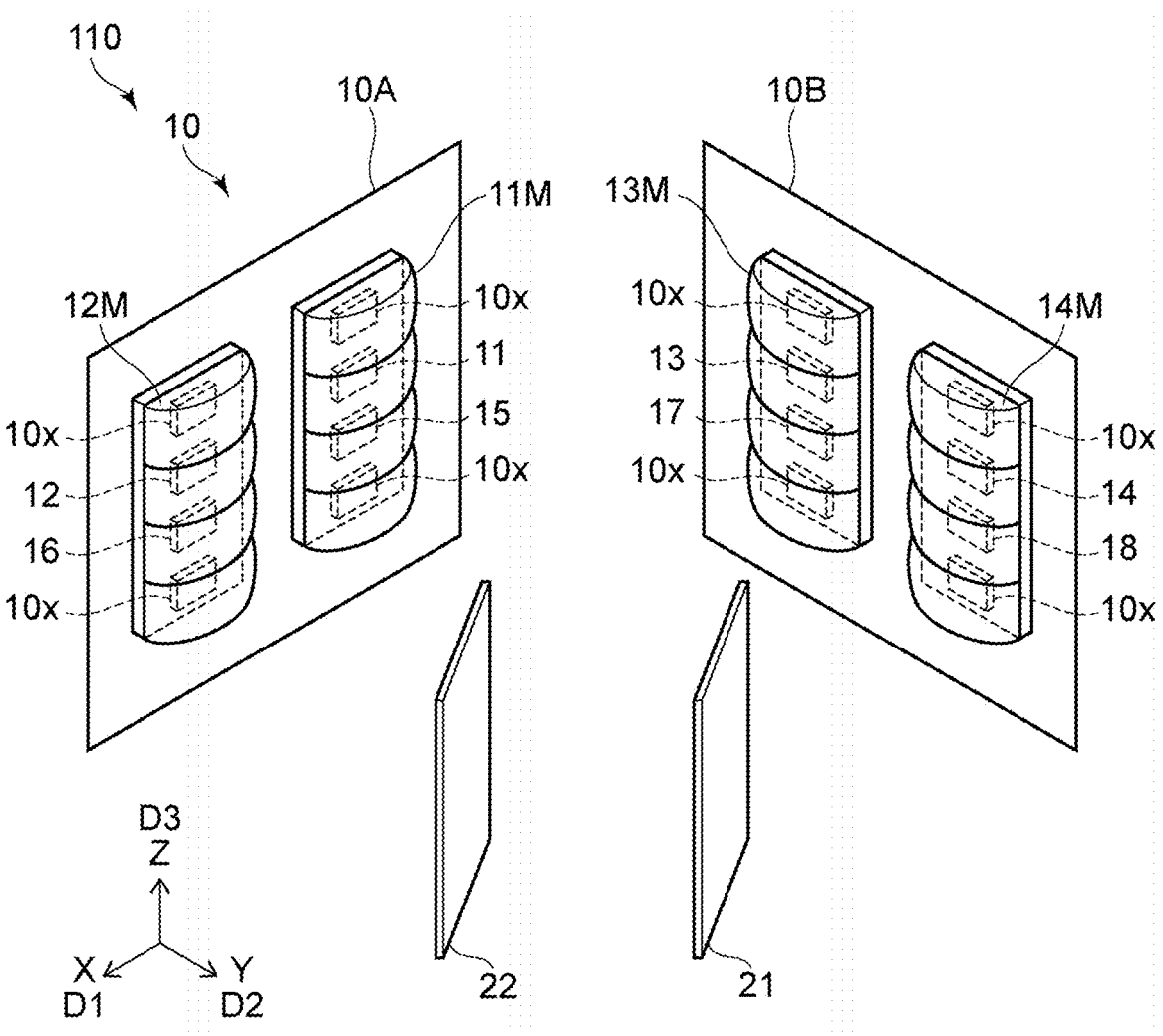
FIG. 1 schematically illustrates a perspective view of a light source device according to a first embodiment.

Embodiments of the present invention are described below with reference to the drawings. The drawings are schematic or conceptual, and the relationships among thicknesses and widths of portions, the proportions of sizes among portions, and the like are not necessarily the same as the actual values thereof. The dimensions and the proportions may be illustrated differently among the drawings, even in a case in which the same portion is illustrated. In the present description, elements same as or similar to those described previously with respect to the drawings already mentioned are denoted by using the same reference characters, and a detailed description thereof is omitted as appropriate.

First Embodiment

Figure 2:
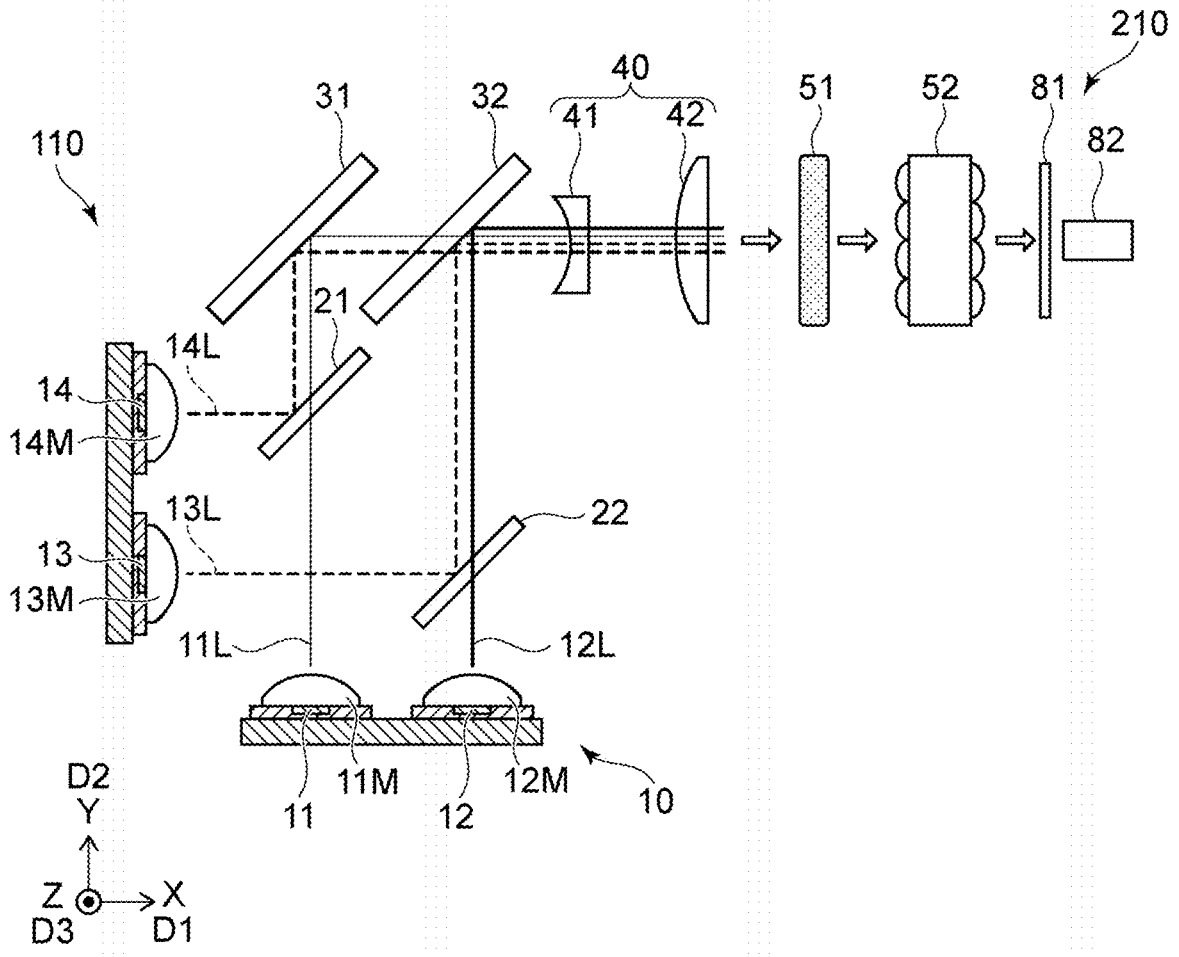
FIG. 2 schematically illustrates a plan view of the light source device according to the first embodiment.
Figure 3:
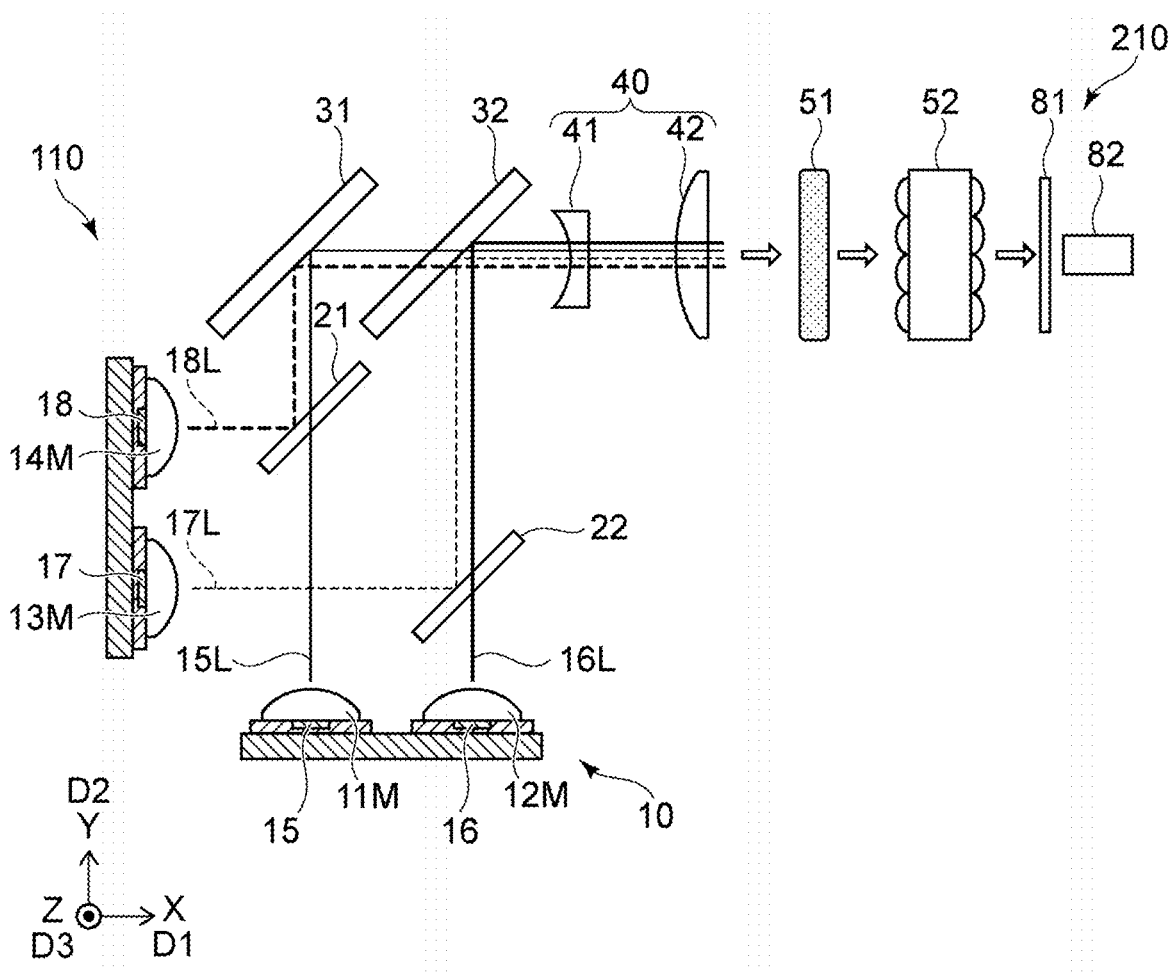
FIG. 3 schematically illustrates another plan view of the light source device according to the first embodiment.

FIG. 1 schematically illustrates a perspective view of a light source device 110 according to a first embodiment. FIGS. 2 and 3 schematically illustrate plan views of the light source device 110 and a display device 210 according to the first embodiment. As illustrated in FIGS. 1 to 3, the light source device 110 according to the present embodiment includes a first optical member 21, a second optical member 22, and a light source unit 10. The light source unit 10 includes a first light source 11, a second light source 12, a third light source 13, a fourth light source 14, a fifth light source 15, a sixth light source 16, a seventh light source 17, and an eighth light source 18.

As illustrated in FIG. 2, the first light source 11 emits first laser light 11L of a first peak wavelength. The second light source 12 emits second laser light 12L of a second peak wavelength. The second peak wavelength is different from the first peak wavelength. The third light source 13 emits third laser light 13L of a third peak wavelength. The third peak wavelength is different from the first peak wavelength and is also different from the second peak wavelength. The fourth light source 14 emits fourth laser light 14L of the second peak wavelength.

As illustrated in FIG. 3, the fifth light source 15 emits fifth laser light 15L of the third peak wavelength. The sixth light source 16 emits sixth laser light 16L of the second peak wavelength. The seventh light source 17 emits seventh laser light 17L of the first peak wavelength. The eighth light source 18 emits eighth laser light 18L of the second peak wavelength.

As illustrated in FIG. 2, the first laser light 11L passes through the first optical member 21. The second laser light 12L passes through the second optical member 22. The third laser light 13L is reflected by the second optical member 22. The fourth laser light 14L is reflected by the first optical member 21.

As illustrated in FIG. 3, the fifth laser light 15L passes through the first optical member 21. The sixth laser light 16L passes through the second optical member 22. The seventh laser light 17L is reflected by the second optical member 22. The eighth laser light 18L is reflected by the first optical member 21.

Each of the first optical member 21 and the second optical member 22 is a dichroic mirror, for example.

As illustrated in FIG. 1, for example, the first light source 11, the second light source 12, the fifth light source 15, and the sixth light source 16 are included in a first module 10A. The third light source 13, the fourth light source 14, the seventh light source 17, and the eighth light source 18 are included in a second module 10B.

The arrangement of the light sources of different wavelengths in the first module 10A corresponds to vertically and horizontally flipped one of the arrangement of the light sources of different wavelength in the second module 10B. With such a configuration, light with more uniform illuminance distribution can be obtained. According to the present embodiment, a light source device with less amount of speckles can be obtained.

In a light source device using a laser light source, speckles may appear. For example, in the light source device illustrated in FIGS. 1 to 3, if the arrangements light sources of different wavelengths in the two modules are same vertically and horizontally and light beams from the respective light sources are incident on a wavelength multiplexing member, light beams of the same wavelengths are incident on locations proximate to each other in the same wavelength multiplexing member, so that light with unevenness in wavelength exits the wavelength multiplexing member. As a result, in the light exiting the wavelength multiplexing member, unevenness in wavelength appears in an irradiation region. Therefore, an illuminance distribution tends to be non-uniform, and wavelength unevenness tends to increase. For that reason, in a member on which light emitted from the light source device is incident, an incident angle varies depending on the wavelength, making it difficult to average degrees of angular diversity of respective wavelengths. When it is difficult to average the degrees of angular diversity of respective wavelengths, a speckle contrast value increases, so that speckles appear.

A configuration in which a sub-fly-array lens is added between a wavelength multiplexing member and a display device is conceivable in order to reduce the difference in an incident angle depending on the wavelength and reduce the speckles. By adding the sub-fly-eye lens, the illuminance distribution of light having exited the wavelength multiplexing member is made uniform. Uniform illuminance distribution allows for averaging the degrees of angular diversity of respective wavelengths of light beams incident on an optical switch, so that the speckles can be reduced. However, the addition of the sub-fly-eye lens increases the number of components and also increases an optical distance, which leads to increase of an optical device in size. The addition of the sub-fly-eye lens also increases the cost.

On the other hand, in the light source device 110 according to the present embodiment, the arrangement of light sources with different wavelengths is vertically and horizontally flipped between two modules of the light source unit 10, and light beams from the respective light sources are incident on wavelength multiplexing members (the first optical member 21 or the second optical member 22). With such opposite arrangement of the respective light sources between two modules of the light source unit 10, light beams with different wavelengths are incident on locations proximate to each other in the same wavelength multiplexing member, so that light with a sparse wavelength distribution exits the wavelength multiplexing member. As a result, in the light exiting the wavelength multiplexing member, the distribution of wavelengths in an irradiation region becomes sparse, and an illuminance distribution can be made uniform. With a uniform illuminance distribution, in a member on which light emitted from the light source device is incident, the difference in incident angles depending on the wavelengths is reduced, and degrees of angular diversity of respective wavelengths are averaged. By averaging the degrees of angular diversity of respective wavelengths, a speckle contrast value can be reduced, and the speckles can be reduced. For example, the illuminance distribution can be made uniform without adding a sub-fly-eye lens, and the degrees of angular diversity of respective wavelengths can be averaged. By adding no sub-fly-eye lens, a light source device that can reduce the speckles while impeding an increase in size and cost of the device can be provided.

In one example, the second peak wavelength is longer than the first peak wavelength. The first peak wavelength is longer than the third peak wavelength.

For example, the first laser light 11L is green light. A peak wavelength of the green light is in a range from 495 nm to 570 nm. The second laser light 12L is red light. A peak wavelength of the red light is in a range from 605 nm to 750 nm. The third laser light 13L is blue light. A peak wavelength of the blue light is in a range from 420 nm to 494 nm. The fourth laser light 14L is red light. The fifth laser light 15L is blue light. The sixth laser light 16L is red light. The seventh laser light 17L is green light. The eighth laser light 18L is red light.

As illustrated in FIGS. 1 to 3, the direction from the first light source 11 to the second light source 12 is along a first direction D1. The direction from the third light source 13 to the fourth light source 14 is along a second direction D2. The second direction D2 intersects the first direction D1. The direction from the fifth light source 15 to the sixth light source 16 is along the first direction D1. The direction from the seventh light source 17 to the eighth light source 18 is along the second direction D2.

The direction from the fifth light source 15 to the first light source 11 is along a third direction D3. The third direction D3 intersects a plane extending in the first direction D1 and the second direction D2. The direction from the sixth light source 16 to the second light source 12 is along the third direction D3. The direction from the seventh light source 17 to the third light source 13 is along the third direction D3. The direction from the eighth light source 18 to the fourth light source 14 is along the third direction D3.

For example, the first direction D1 is defined as an X-axis direction. One direction perpendicular to the X-axis direction is defined as a Y-axis direction. A direction perpendicular to the X-axis direction and the Y-axis direction is defined as a Z-axis direction. The second direction D2 is, for example, the Y-axis direction. The third direction D3 is, for example, the Z-axis direction.

As illustrated in FIG. 2, the first laser light 11L is emitted from the first light source 11 along the second direction D2. The second laser light 12L is emitted from the second light source 12 along the second direction D2. The third laser light 13L is emitted from the third light source 13 along the first direction D1. The fourth laser light 14L is emitted from the fourth light source 14 along the first direction D1.

As illustrated in FIG. 3, the fifth laser light 15L is emitted from the fifth light source 15 along the second direction D2. The sixth laser light 16L is emitted from the sixth light source 16 along the second direction D2. The seventh laser light 17L is emitted from the seventh light source 17 along the first direction D1. The eighth laser light 18L is emitted from the eighth light source 18 along the first direction D1.

In this example, a distance between the first light source 11 and the third light source 13 is shorter than a distance between the first light source 11 and the fourth light source 14. The distance between the first light source 11 and the third light source 13 is shorter than a distance between the second light source 12 and the third light source 13. A distance between the fifth light source 15 and the seventh light source 17 is shorter than a distance between the sixth light source 16 and the seventh light source 17. The distance between the fifth light source 15 and the seventh light source 17 is shorter than a distance between the fifth light source 15 and the eighth light source 18. As will be described below, the positional relationship among these light sources can be changed.

As illustrated in FIGS. 2 and 3, the light source device 110 may further include a first mirror 31 and a second mirror 32.

As illustrated in FIG. 2, the first laser light 11L having passed through the first optical member 21 and the fourth laser light 14L having been reflected by the first optical member 21 are reflected by the first mirror 31 and then pass through the second mirror 32. The second laser light 12L having passed through the second optical member 22 and the third laser light 13L having been reflected by the second optical member 22 are reflected by the second mirror 32.

As illustrated in FIG. 3, the fifth laser light 15L having passed through the first optical member 21 and the eighth laser light 18L having been reflected by the first optical member 21 are reflected by the first mirror 31 and then pass through the second mirror 32. The sixth laser light 16L having passed through the second optical member 22 and the seventh laser light 17L having been reflected by the second optical member 22 are reflected by the second mirror 32.

The first mirror 31 is, for example, a total reflection mirror. The second mirror 32 is, for example, a reflective polarizing element. In the present embodiment, wavelength combining is performed, and then polarization combining is performed.

As illustrated in FIGS. 2 and 3, the light source device 110 may further include a light shaping member 40. The first laser light 11L and the fourth laser light 14L having passed through the second mirror 32 pass through the light shaping member 40. The second laser light 12L and the third laser light 13L having been reflected by the second mirror 32 pass through the light shaping member 40. The fifth laser light 15L and the eighth laser light 18L having passed through the second mirror 32 pass through the light shaping member 40.

The sixth laser light 16L and the seventh laser light 17L having been reflected by the second mirror 32 pass through the light shaping member 40.

For example, the light shaping member 40 includes a first lens 41 and a second lens 42. In one example, the first lens 41 is one of a concave lens and a convex lens. In one example, the second lens 42 is the other of the concave lens and the convex lens. For example, the first lens 41 and/or the second lens 42 may be a cylindrical lens.

Light including the first to eighth laser light beams 11L to 18L is shaped by the light shaping member 40. The light shaping member 40 expands the width of the light including the first to eighth laser light beams 11L to 18L in an appropriate direction and mixes the light.

As illustrated in FIGS. 2 and 3, the light source device 110 may further include a diffusion element 51. As the diffusion element 51, a cylinder lens array, a microlens array, or a plate having a textured surface can be used. The first to eighth laser light beams 11L to 18L having exited the light shaping member 40 are incident on the diffusion element 51. An exit angle of the light including the first to eighth laser light beams 11L to 18L is modified by the diffusion element 51.

As illustrated in FIGS. 2 and 3, the light source device 110 may further include a fly-eye lens 52. The first to eighth laser light beams 11L to 18L having exited the diffusion element 51 pass through the fly-eye lens 52. The light including the first to eighth laser light beams 11L to 18L is further shaped into substantially uniform light by the fly-eye lens 52.

As illustrated in FIGS. 2 and 3, the light having exited the fly-eye lens 52 is incident on a control element 81. The control element 81 includes, for example, a plurality (e.g., an array) of optical switches. The control element 81 may include, for example, an element manufactured employing micro electro mechanical systems (MEMS). Light for forming an image to be displayed is obtained by the control element 81.

As illustrated in FIGS. 2 and 3, an imaging optical member 82 may be provided. The imaging optical member 82 forms an image of light exiting the control element 81. The imaging optical member 82 includes, for example, a projection lens or the like.

FIGS. 4 to 7 schematically illustrate the states of light beams according to the first embodiment. These drawings schematically illustrate the states of the light beams on a plane perpendicular to the traveling directions of the light beams.

Figure 4:
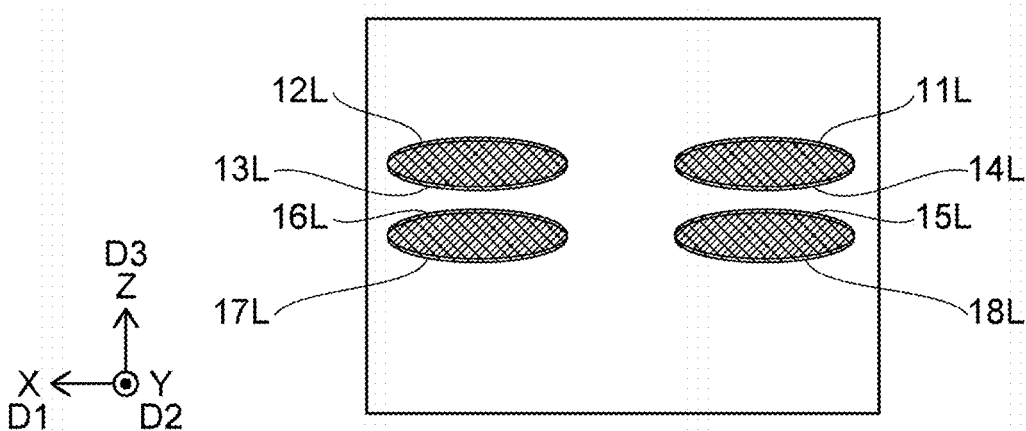
FIG. 4 schematically illustrates states of light beams according to the first embodiment.

FIG. 4 illustrates the states of the laser light beams before entering the first mirror 31 and the second mirror 32 after passing through or being reflected by the first optical member 21 and the second optical member 22. The first laser light 11L and the fourth laser light 14L overlap each other. The second laser light 12L and the third laser light 13L overlap each other. The fifth laser light 15L and the eighth laser light 18L overlap each other. The sixth laser light 16L and the seventh laser light 17L overlap each other. In a specific implementation, in the states of the laser light beams illustrated in FIG. 4, because the arrangement of the light sources of different wavelengths is vertically and horizontally flipped between two modules of the light source unit 10, the green laser light and the red laser light overlap each other in the upper right laser light spot in FIG. 4. In the upper left laser light spot, the blue laser light and the red laser light overlap each other. In the lower right laser light spot, the blue laser light and the red laser light overlap each other. In the lower left laser light spot, the green laser light and the red laser light overlap each other. On the other hand, if the light sources with different wavelengths were arranged in the same manner vertically and horizontally between two modules of the light source unit 10, the green laser light and the green laser light would overlap each other in the upper right laser light spot. In the upper left laser light spot, the red laser light and the red laser light would overlap each other. In the lower right laser light spot, the blue laser light and the blue laser light would overlap each other. In the lower left laser light spot, the red laser light and the red laser light would overlap each other. By arranging the light sources with different wavelengths in a manner vertically and horizontally flipped between two modules of the light source unit 10, the wavelength distribution can be more averaged.

Figure 5:
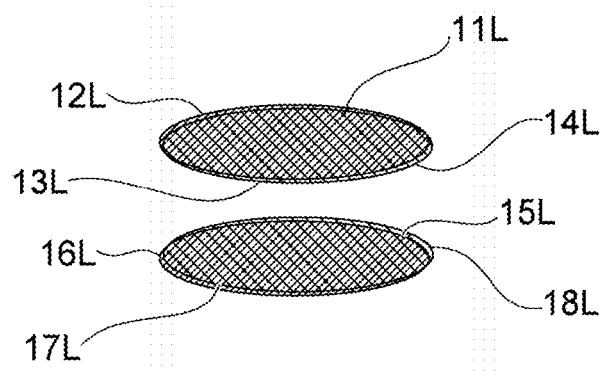
FIG. 5 schematically illustrates other states of light beams according to the first embodiment.

FIG. 5 illustrates the states of the light beams having exited the second mirror 32. The first to fourth laser light beams 11L to 14L overlap with each other. The fifth to eighth laser light beams 15L to 18L overlap with each other. For example, in the states of the laser light beams illustrated in FIG. 5, the light sources with different wavelengths are arranged in a manner vertically and horizontally flipped between two modules of the light source unit 10, the green, red, and blue laser light beams overlap each other in both the upper laser light spot and the lower laser light spot. In contrast, if the light sources with different wavelengths were arranged in the same manner vertically and horizontally between two modules of the light source unit 10, the green and red laser light beams would overlap each other in the upper laser light spot, and the blue and red laser light beams would overlap each other in the lower laser light spot. In the present embodiment, also in the states of the laser light beams illustrated in FIG. 5, the light sources with different wavelengths are arranged in the manner vertically and horizontally flipped between two modules of the light source unit 10, so that the wavelength distribution can be more averaged.

Figure 6:
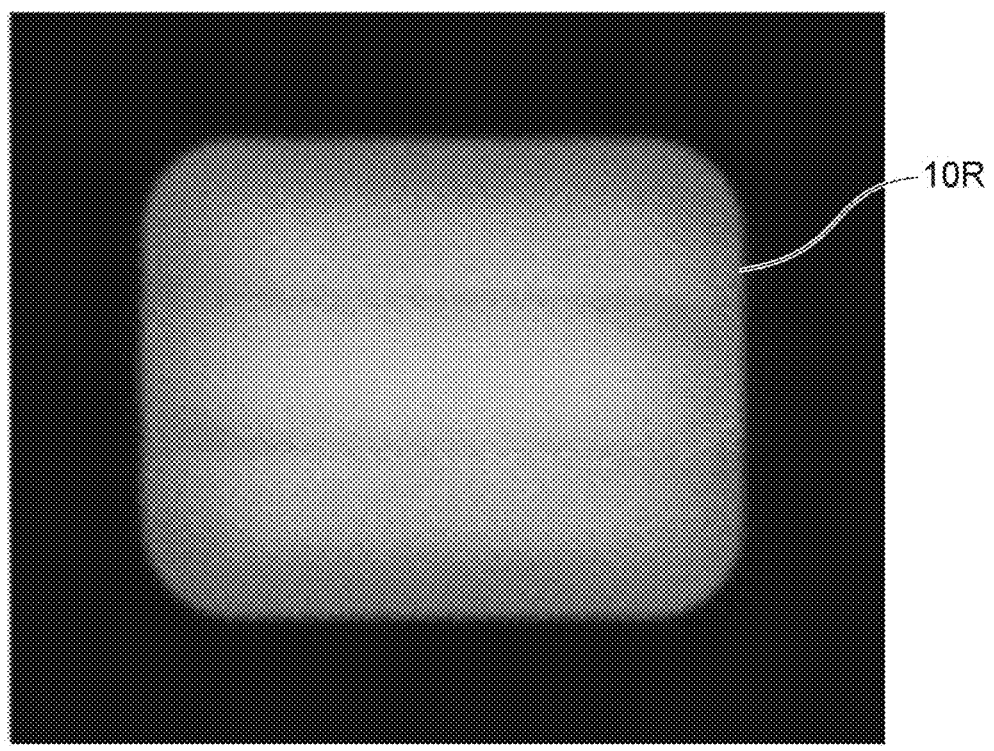
FIG. 6 schematically illustrates other states of light beams according to the first embodiment.
Figure 7:
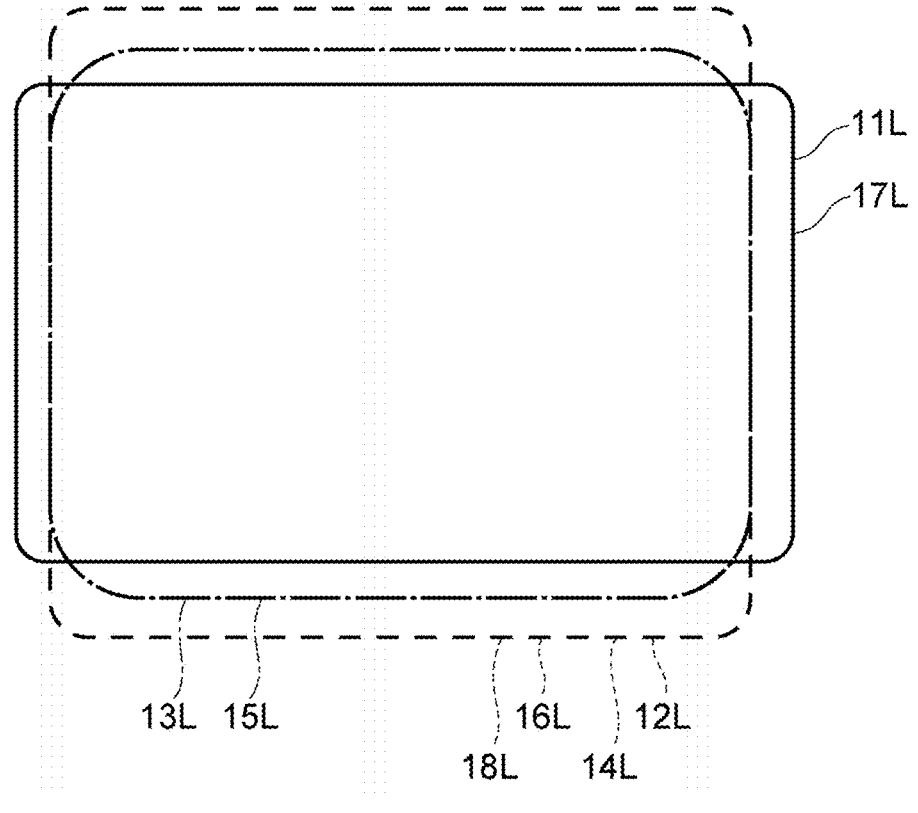
FIG. 7 schematically illustrates other states of light beams according to the first embodiment.

FIGS. 6 and 7 illustrate the states of the light beams having exited the light shaping member 40. An irradiation region 10R of the light including the first to eighth laser light beams 11L to 18L has a substantially rectangular shape (including a square shape).

In one example, the light having exited the light shaping member 40 is substantially white. The light exited from the light shaping member 40 may have a color different from white. The irradiation region 10R with uniform illuminance is obtained.

As illustrated in FIGS. 1 to 3, the light source unit 10 may include a first sealing member 11M, a second sealing member 12M, a third sealing member 13M, and a fourth sealing member 14M. The first sealing member 11M seals the first light source 11 and the fifth light source 15. The second sealing member 12M seals the second light source 12 and the sixth light source 16. The third sealing member 13M seals the third light source 13 and the seventh light source 17. The fourth sealing member 14M seals the fourth light source 14 and the eighth light source 18. The first sealing member 11M, the second sealing member 12M, the third sealing member 13M, and the fourth sealing member 14M are spaced apart from each other.

Preferably, the first sealing member 11M, the second sealing member 12M, the third sealing member 13M, and the fourth sealing member 14M are spaced apart from each other. The first sealing member 11M and the second sealing member 12M may be in contact with each other. The first sealing member 11M and the second sealing member 12M may be formed integrally with each other. The third sealing member 13M and the fourth sealing member 14M may be in contact with each other. The third sealing member 13M and the fourth sealing member 14M may be formed integrally with each other.

As illustrated in FIG. 1, the light source unit 10 may include one or a plurality of different light sources 10x in addition to the first to eighth light sources 11 to 18. The different light source 10x emits laser light. The laser light emitted from the different light sources 10x may pass through or be reflected by the first optical member 21 or the second optical member 22 and may be incident on the first mirror 31 or the second mirror 32. The peak wavelength of the laser light emitted from the different light sources 10x is randomly selectable. By providing the different light source 10x, a higher luminous flux is obtained. When the light sources 10x with the same wavelength are provided at vertically and horizontally flipped positions between two modules of the light source unit 10, a higher light flux is obtained while maintaining a uniform illuminance distribution. FIGS. 4 to 6 do not illustrate laser light emitted from the different light source 10x.

Figure 8:
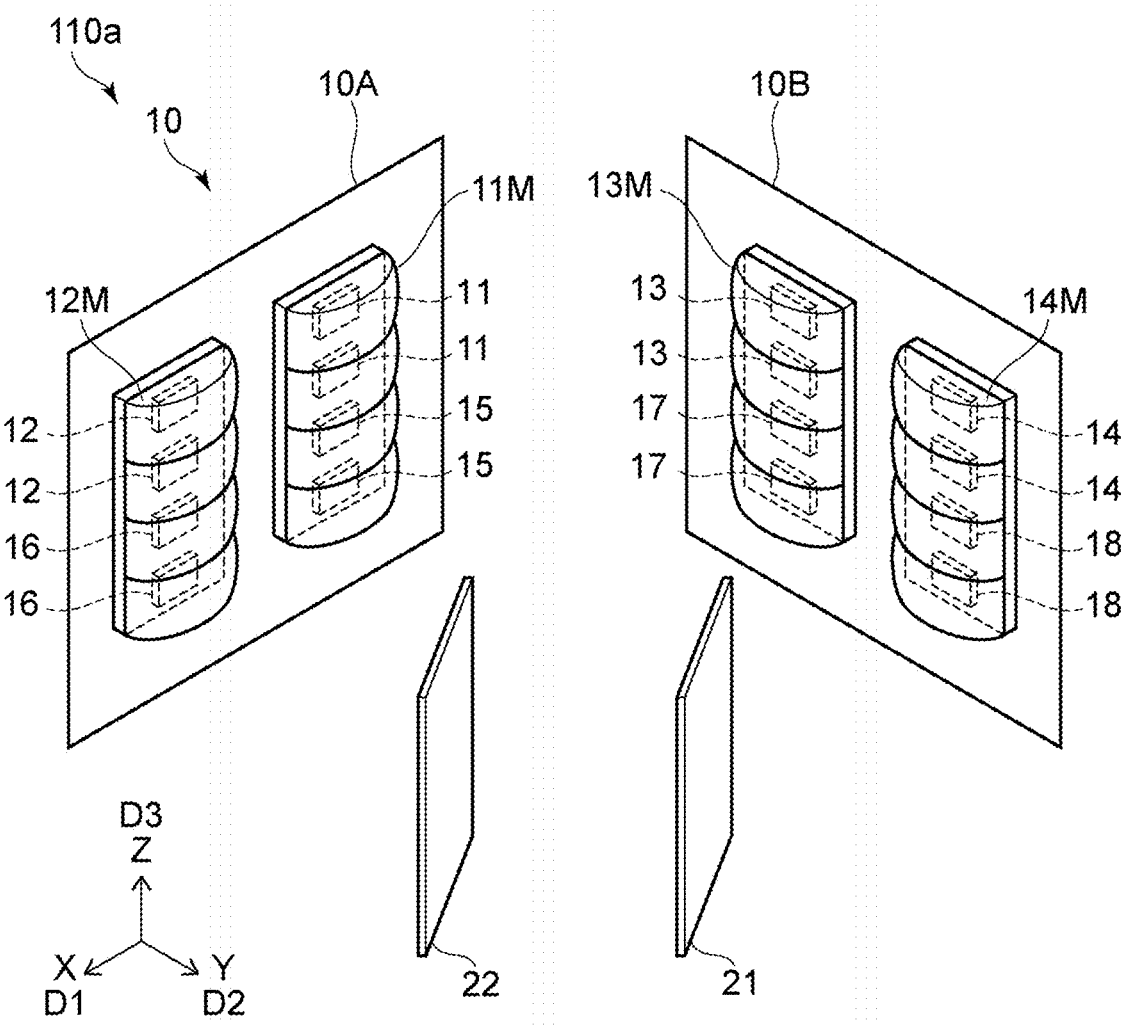
FIG. 8 schematically illustrates a perspective view of another light source device according to the first embodiment.

FIG. 8 schematically illustrates a perspective view of a light source device 110a according to the first embodiment. As illustrated in FIG. 8, in the light source device 110a according to the present embodiment, the light source unit 10 may include a plurality of first light sources 11 and a plurality of third light sources 13. The direction from one of the plurality of first light sources 11 to another one of the plurality of first light sources 11 is along the third direction D3. The direction from one of the plurality of third light sources 13 to another one of the plurality of third light sources 13 is along the third direction D3.

As illustrated in FIG. 8, the light source unit 10 may include a plurality of fifth light sources 15 and a plurality of seventh light sources 17. The direction from one of the plurality of fifth light sources 15 to another one of the plurality of fifth light sources 15 is along the third direction D3. The direction from one of the plurality of seventh light sources 17 to another one of the plurality of seventh light sources 17 is along the third direction D3. The configuration of the light source device 110a except for the above is the same as or similar to the configuration of the light source device 110. Also in the light source device 110a, a light source device can be provided in which the speckles can be reduced.

Figure 9:
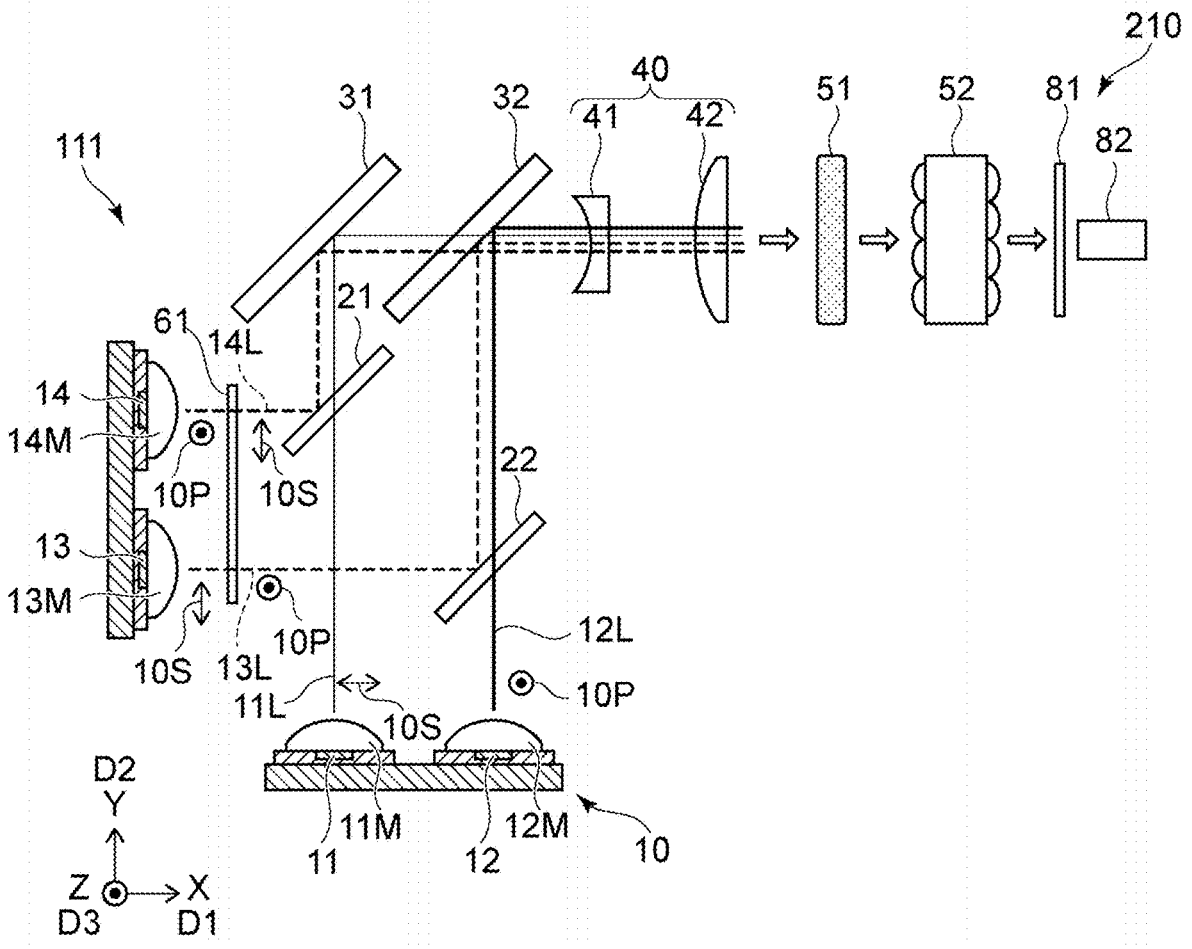
FIG. 9 schematically illustrates a plan view of still another light source device according to the first embodiment.
Figure 10:
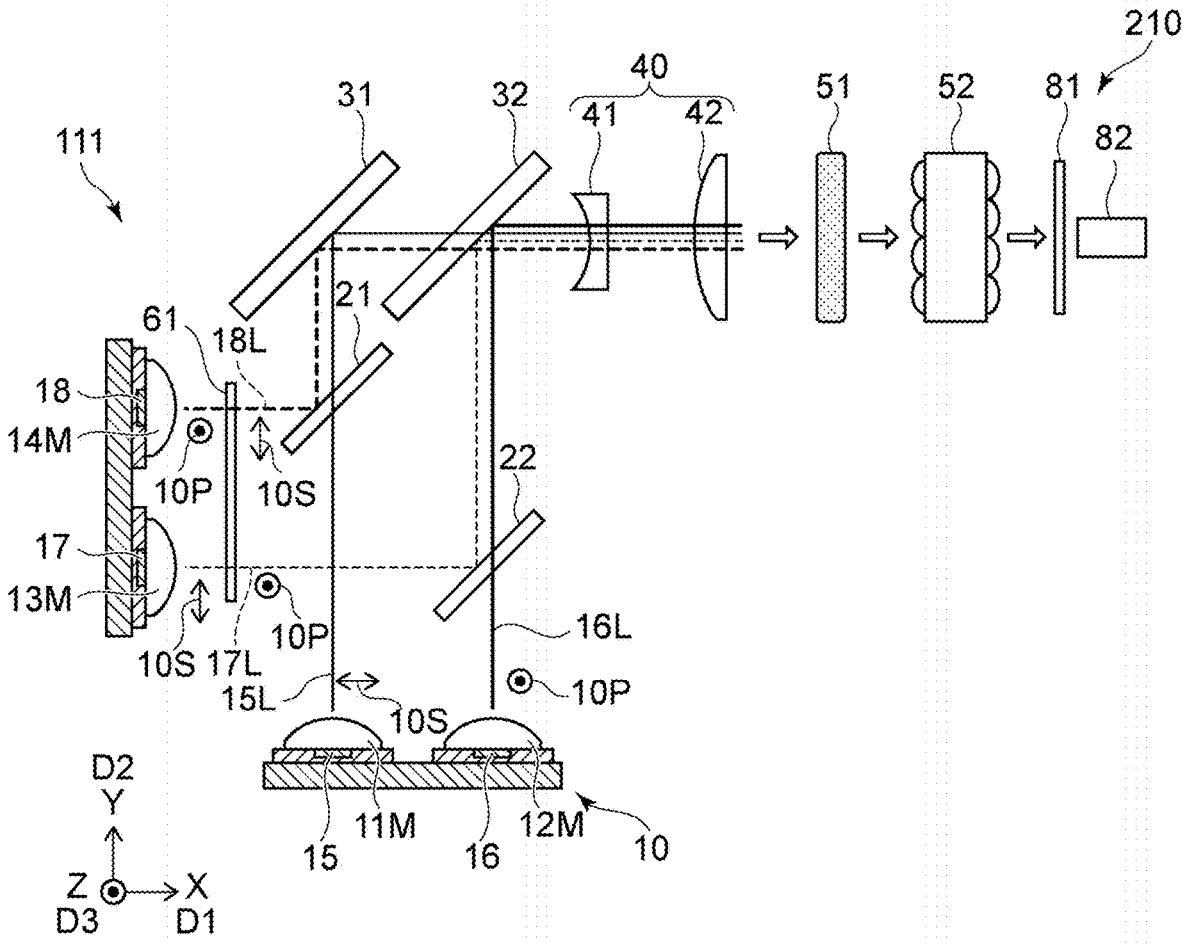
FIG. 10 schematically illustrates another plan view of the light source device depicted in FIG. 9.

FIGS. 9 and 10 schematically illustrate plan views of a light source device 111 and the display device 210 according to the first embodiment. As illustrated in FIG. 9, in the light source device 111 according to the present embodiment, first laser light 11L emitted from a first light source 11 is an S-polarized light 10S. The first laser light 11L of the S-polarized light 10S is incident on the first optical member 21. The second laser light 12L emitted from the second light source 12 is a P-polarized light 10P. The second laser light 12L of the P-polarized light 10P is incident on the second optical member 22.

The oscillation direction of an electric field in the P-polarized light 10P is along the third direction D3. The oscillation direction of an electric field in the S-polarized light 10S is perpendicular to the traveling direction of light, and intersects (for example, is orthogonal to) the oscillation direction of the electric field in the P-polarized light 10P.

As illustrated in FIG. 9, a phase element 61 is provided. The phase element 61 is, for example, a half-wave plate. For example, the third laser light 13L emitted from the third light source 13 is the S-polarized light 10S. The third laser light 13L of the S-polarized light 10S passes through the phase element 61 and is converted into the P-polarized light 10P.

The third laser light 13L converted into the P-polarized light 10P is incident on the second optical member 22. For example, the fourth laser light 14L emitted from the fourth light source 14 is the P-polarized light 10P. The fourth laser light 14L of the P-polarized light 10P passes through the phase element 61 and is converted into the S-polarized light 10S. The fourth laser light 14L converted into the S-polarized light 10S is incident on the first optical member 21.

As illustrated in FIG. 10, the fifth laser light 15L emitted from the fifth light source 15 is the S-polarized light 10S. The fifth laser light 15L of the S-polarized light 10S is incident on the first optical member 21. The sixth laser light 16L emitted from the sixth light source 16 is the P-polarized light 10P. The sixth laser light 16L of the P-polarized light 10P is incident on the second optical member 22.

As illustrated in FIG. 10, for example, the seventh laser light 17L emitted from the seventh light source 17 is the S-polarized light 10S. The seventh laser light 17L of the S-polarized light 10S passes through the phase element 61 and is converted into the P-polarized light 10P. The seventh laser light 17L converted into the P-polarized light 10P is incident on the second optical member 22. For example, the eighth laser light 18L emitted from the eighth light source 18 is the P-polarized light 10P. The eighth laser light 18L of the P-polarized light 10P passes through the phase element 61 and is converted into the S-polarized light 10S. The eighth laser light 18L converted into the S-polarized light 10S is incident on the first optical member 21.

When using light sources that emit different polarized light beams, the phase element 61 allows for aligning the polarizations of light beams and performing polarization multiplexing.

Figure 11:
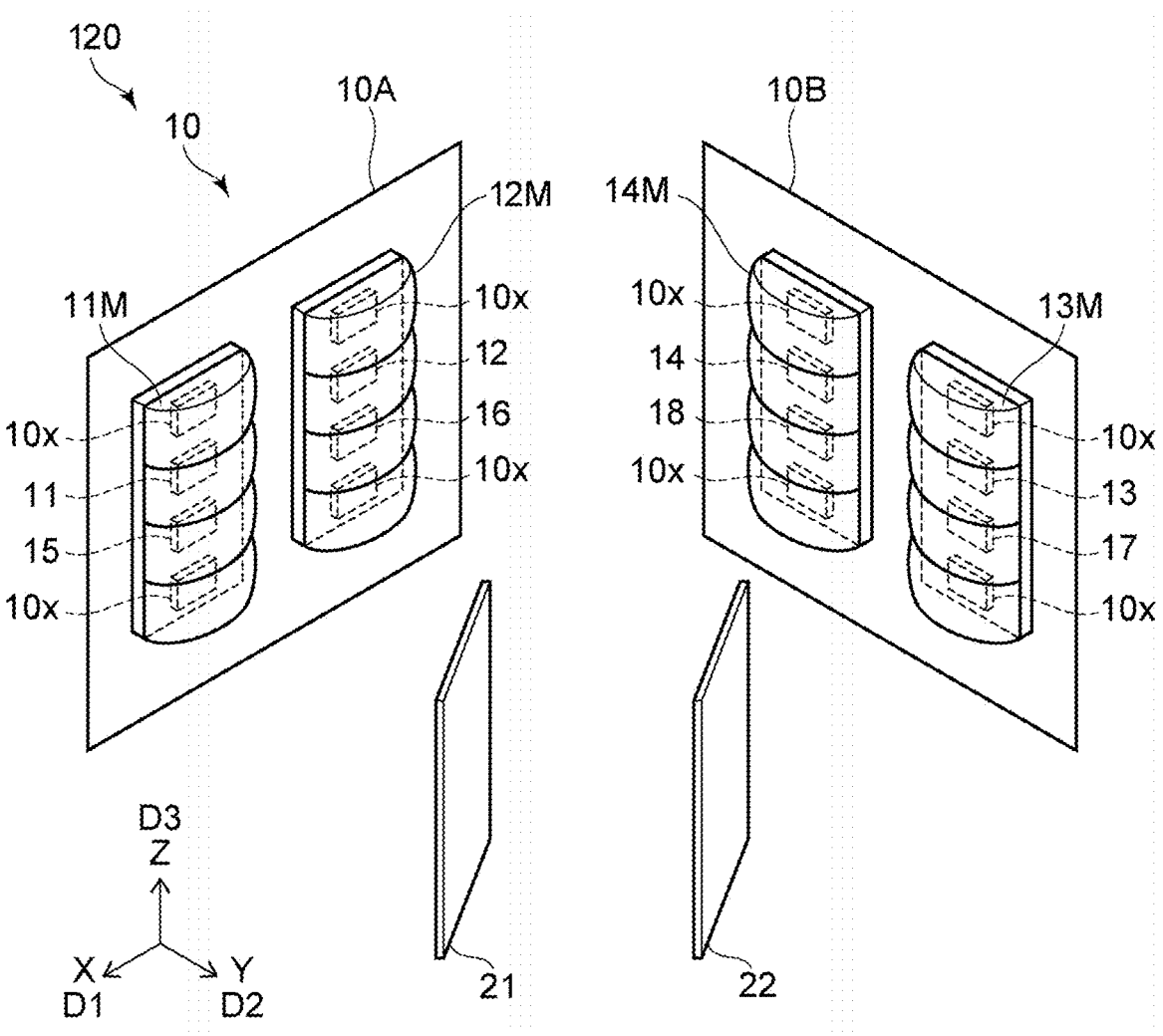
FIG. 11 schematically illustrates a perspective view of still another light source device according to the first embodiment.
Figure 12:
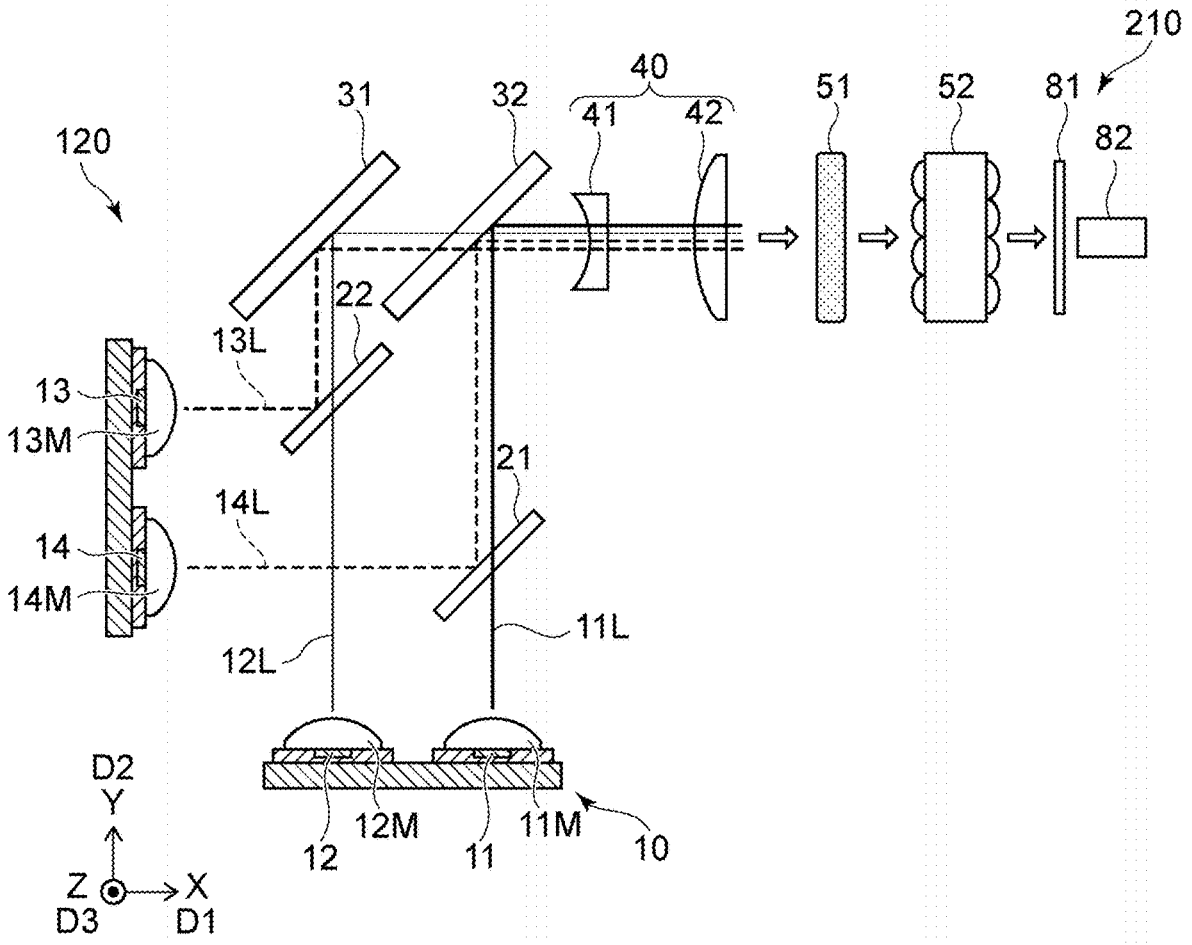
FIG. 12 schematically illustrates a plan view of the light source device depicted in FIG. 11.
Figure 13:
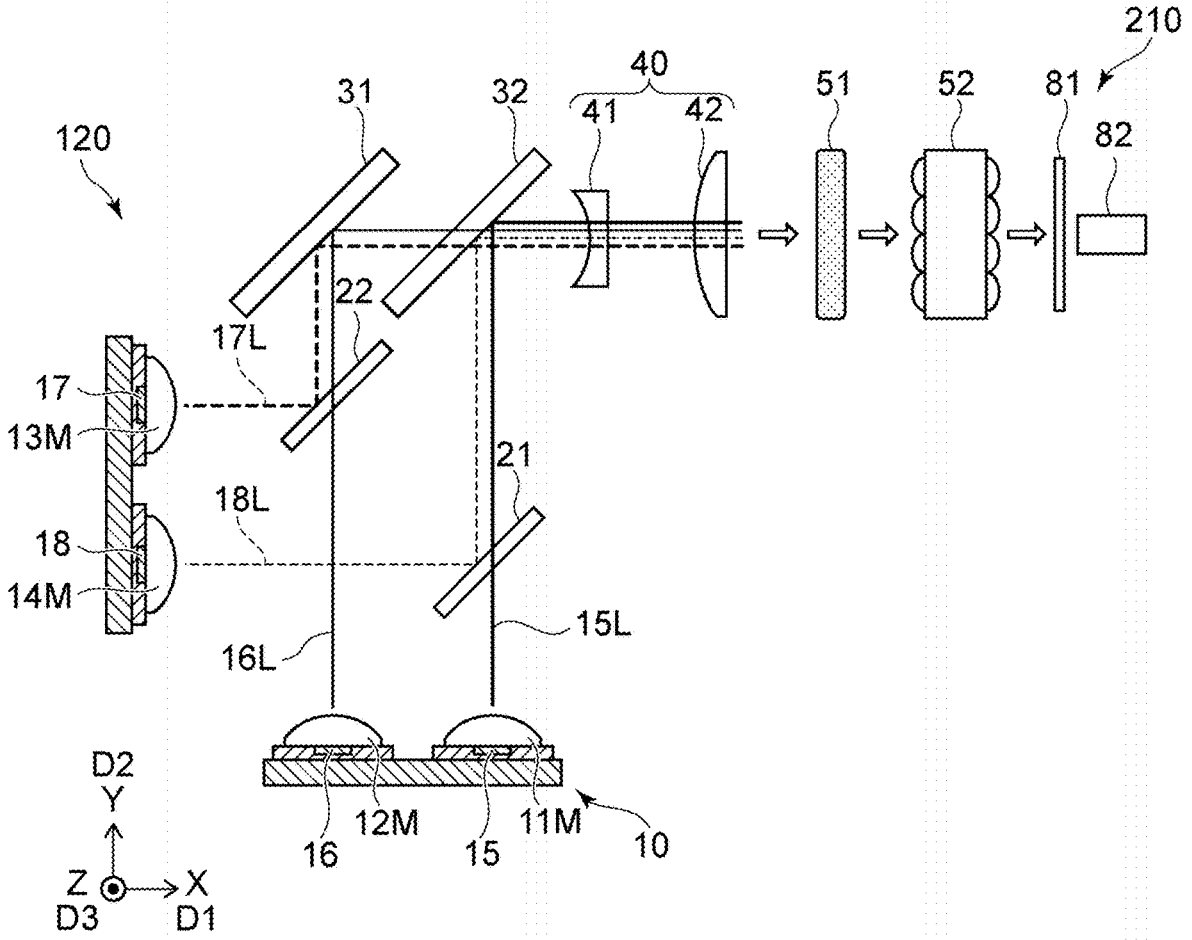
FIG. 13 schematically illustrates another plan view of the light source device depicted in FIG. 11.

FIG. 11 schematically illustrates a perspective view of a light source device 120 according to the first embodiment. FIGS. 12 and 13 schematically illustrate plan views of the light source device 120 and the display device 210 according to the first embodiment. As illustrated in FIGS. 11 to 13, the light source device 120 according to the present embodiment includes the first optical member 21, the second optical member 22, and the light source unit 10. The light source unit 10 includes the first light source 11, the second light source 12, the third light source 13, the fourth light source 14, the fifth light source 15, the sixth light source 16, the seventh light source 17, and the eighth light source 18. In the light source device 120, the positions of the light sources of different wavelengths are different from those in the light source device 110. Except for this, the configuration of the light source device 120 is the same as or similar to the configuration of the light source device 110.

As illustrated in FIG. 12, in the light source device 120, a distance between the second light source 12 and the fourth light source 14 is shorter than a distance between the second light source 12 and the third light source 13. The distance between the second light source 12 and the fourth light source 14 is shorter than a distance between the first light source 11 and the fourth light source 14.

As illustrated in FIG. 13, in the light source device 120, a distance between the sixth light source 16 and the eighth light source 18 is shorter than a distance between the sixth light source 16 and the seventh light source 17. The distance between the sixth light source 16 and the eighth light source 18 is shorter than a distance between the fifth light source 15 and the eighth light source 18.

As illustrated in FIG. 12, the second laser light 12L having passed through the second optical member 22 and the third laser light 13L having been reflected by the second optical member 22 are reflected by the first mirror 31 and then pass through the second mirror 32. The first laser light 11L having passed through the first optical member 21 and the fourth laser light 14L having been reflected by the first optical member 21 are reflected by the second mirror 32.

As illustrated in FIG. 13, the sixth laser light 16L having passed through the second optical member 22 and the seventh laser light 17L having been reflected by the second optical member 22 are reflected by the first mirror 31 and then pass through the second mirror 32. The fifth laser light 15L having passed through the first optical member 21 and the eighth laser light 18L having been reflected by the first optical member 21 are reflected by the second mirror 32.

As illustrated in FIG. 12, the second laser light 12L and the third laser light 13L having passed through the second mirror 32 pass through the light shaping member 40. The first laser light 11L and the fourth laser light 14L having been reflected by the second mirror 32 pass through the light shaping member 40.

As illustrated in FIG. 13, the sixth laser light 16L and the seventh laser light 17L having passed through the second mirror 32 pass through the light shaping member 40. The fifth laser light 15L and the eighth laser light 18L having been reflected by the second mirror 32 pass through the light shaping member 40.

Also in the light source device 120, a light source device that can average angular multiplicities of respective wavelengths and reduce the speckles can be provided.

Figure 14:
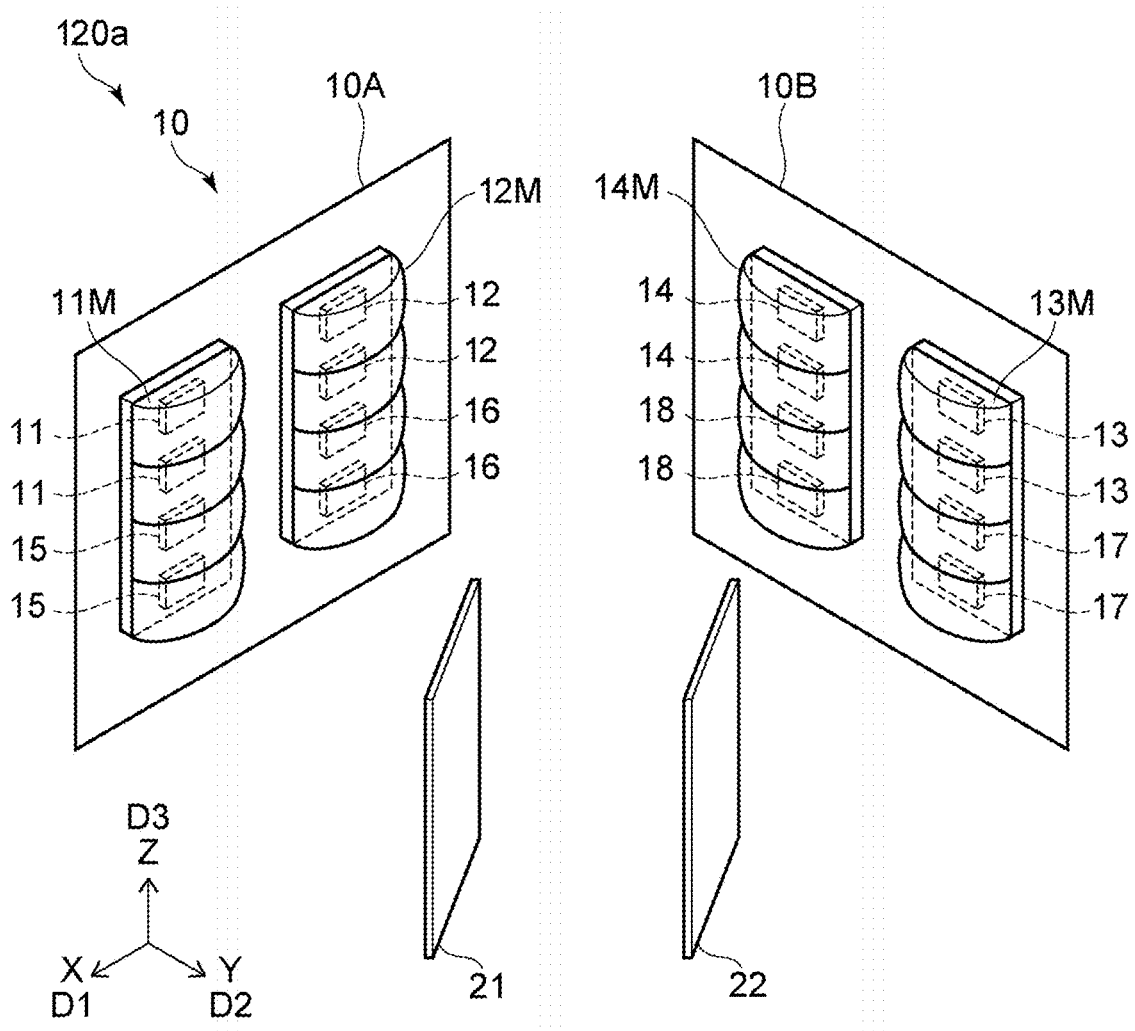
FIG. 14 schematically illustrates a perspective view of still another light source device according to the first embodiment.

FIG. 14 schematically illustrates a perspective view of a light source device 120a according to the first embodiment. As illustrated in FIG. 14, in the light source device 120a according to the present embodiment, the light source unit 10 may include a plurality of first light sources 11 and a plurality of third light sources 13. The direction from one of the plurality of first light sources 11 to another one of the plurality of first light sources 11 is along the third direction D3. The direction from one of the plurality of third light sources 13 to another one of the plurality of third light sources 13 is along the third direction D3.

As illustrated in FIG. 14, the light source unit 10 may include a plurality of fifth light sources 15 and a plurality of seventh light sources 17. The direction from one of the plurality of fifth light sources 15 to another one of the plurality of fifth light sources 15 is along the third direction D3. The direction from one of the plurality of seventh light sources 17 to another one of the plurality of seventh light sources 17 is along the third direction D3. The configuration of the light source device 120a except for the above is the same as or similar to the configuration of the light source device 120. Also in the light source device 120a, a light source device that can average angular multiplicities of respective wavelengths and reduce the speckles can be provided.

In the light source devices 110a and 120a, a plurality of second light sources 12, a plurality of fourth light sources 14, a plurality of sixth light sources 16, and a plurality of eighth light sources 18 may be provided. The direction from one of the plurality of second light sources 12 to another one of the plurality of second light sources 12 is along the third direction D3. The direction from one of the plurality of fourth light sources 14 to another one of the plurality of fourth light sources 14 is along the third direction D3. The direction from one of the plurality of sixth light sources 16 to another one of the plurality of sixth light sources 16 is along the third direction D3. The direction from one of the plurality of eighth light sources 18 to another one of the plurality of eighth light sources 18 is along the third direction D3.

Figure 15:
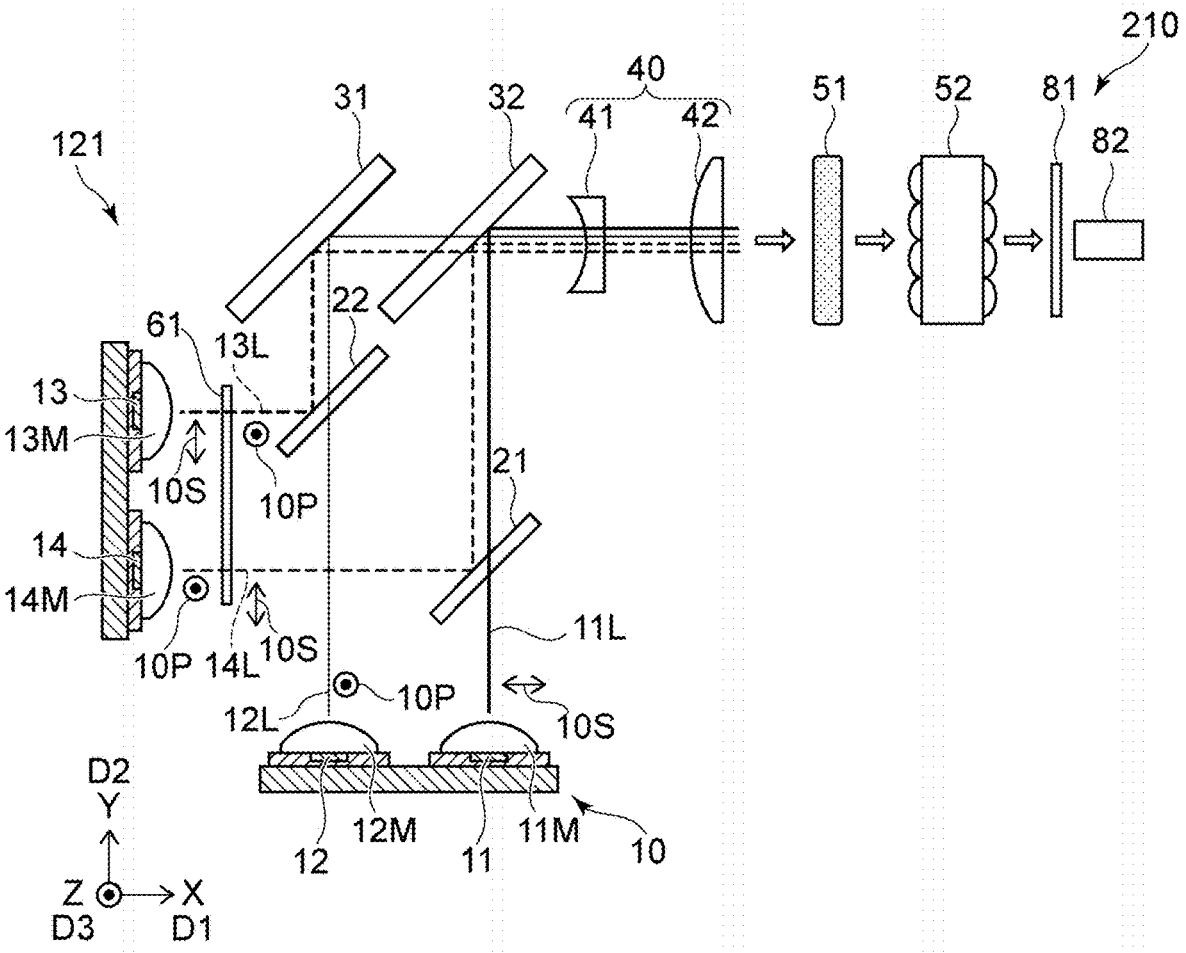
FIG. 15 schematically illustrates a plan view of still another light source device according to the first embodiment.
Figure 16:
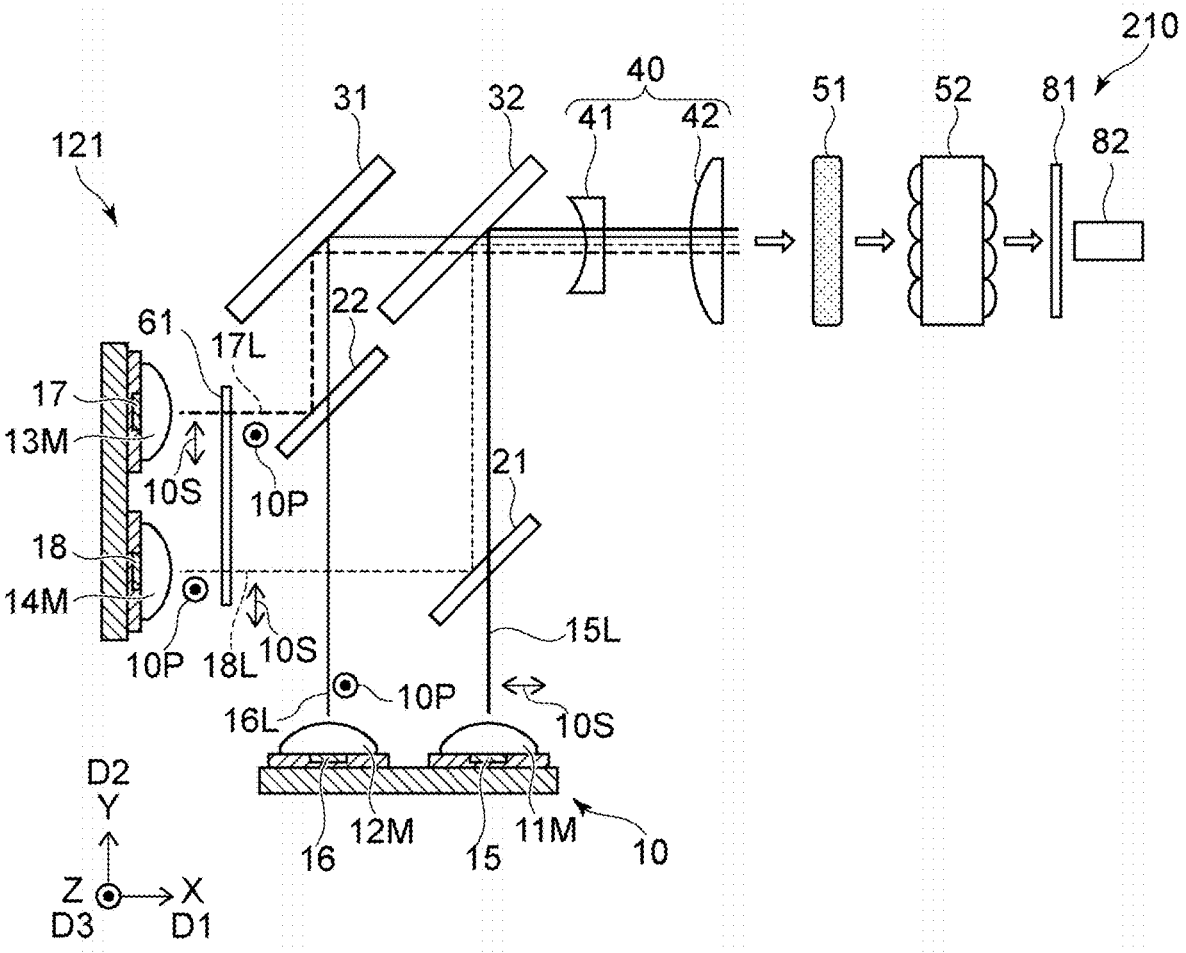
FIG. 16 schematically illustrates another plan view of the light source device depicted in FIG. 15.

FIGS. 15 and 16 schematically illustrate plan views of a light source device 121 and the display device 210 according to the first embodiment. As illustrated in FIG. 15, for example, in the light source device 121 according to the present embodiment, the first laser light 11L of the S-polarized light 10S is incident on the first optical member 21. The second laser light 12L of the P-polarized light 10P is incident on the second optical member 22.

As illustrated in FIG. 15, the phase element 61 (for example, a half-wave plate) is provided. For example, the third laser light 13L emitted from the third light source 13 is the S-polarized light 10S. The third laser light 13L converted into the P-polarized light 10P by passing through the phase element 61 is incident on the second optical member 22. For example, the fourth laser light 14L emitted from the fourth light source 14 is the P-polarized light 10P. The fourth laser light 14L converted into the S-polarized light 10S by passing through the phase element 61 is incident on the first optical member 21.

As illustrated in FIG. 16, for example, the fifth laser light 15L of the S-polarized light 10S is incident on the first optical member 21. The sixth laser light 16L of the P-polarized light 10P is incident on the second optical member 22.

As illustrated in FIG. 16, for example, the seventh laser light 17L emitted from the seventh light source 17 is the S-polarized light 10S. The seventh laser light 17L converted into the P-polarized light 10P by passing through the phase element 61 is incident on the second optical member 22. For example, the eighth laser light 18L emitted from the eighth light source 18 is the P-polarized light 10P. The eighth laser light 18L converted into the S-polarized light 10S by passing through the phase element 61 is incident on the first optical member 21.

In the present embodiment, a maximum brightness value in the irradiation region 10R is set to 100%. In the irradiation region 10R, a region excluding a portion where a brightness value is 10% or less of the maximum brightness value is equally divided into 16 regions. Among the average brightness values of the respective 16 equally divided regions, an average brightness value in a region having the lowest average brightness value is defined as a first value. An average brightness value in a region having the highest average brightness value is set as a second value. A ratio of the first value to the second value is referred to as a first ratio. When the first ratio is high, the uniformity of illuminance distribution is high. In the present embodiment, in one example of a state in which the illuminance distribution is uniform, the first ratio is equal to or greater than 50%. In another example of a state in which the illuminance distribution is uniform, the first ratio is equal to or greater than 65%. In another example of a state in which the illuminance distribution is uniform, the first ratio is equal to or greater than 80%. When the first ratio is excessively low, reduction of the speckles may be insufficient.

Second Embodiment

Figure 17:
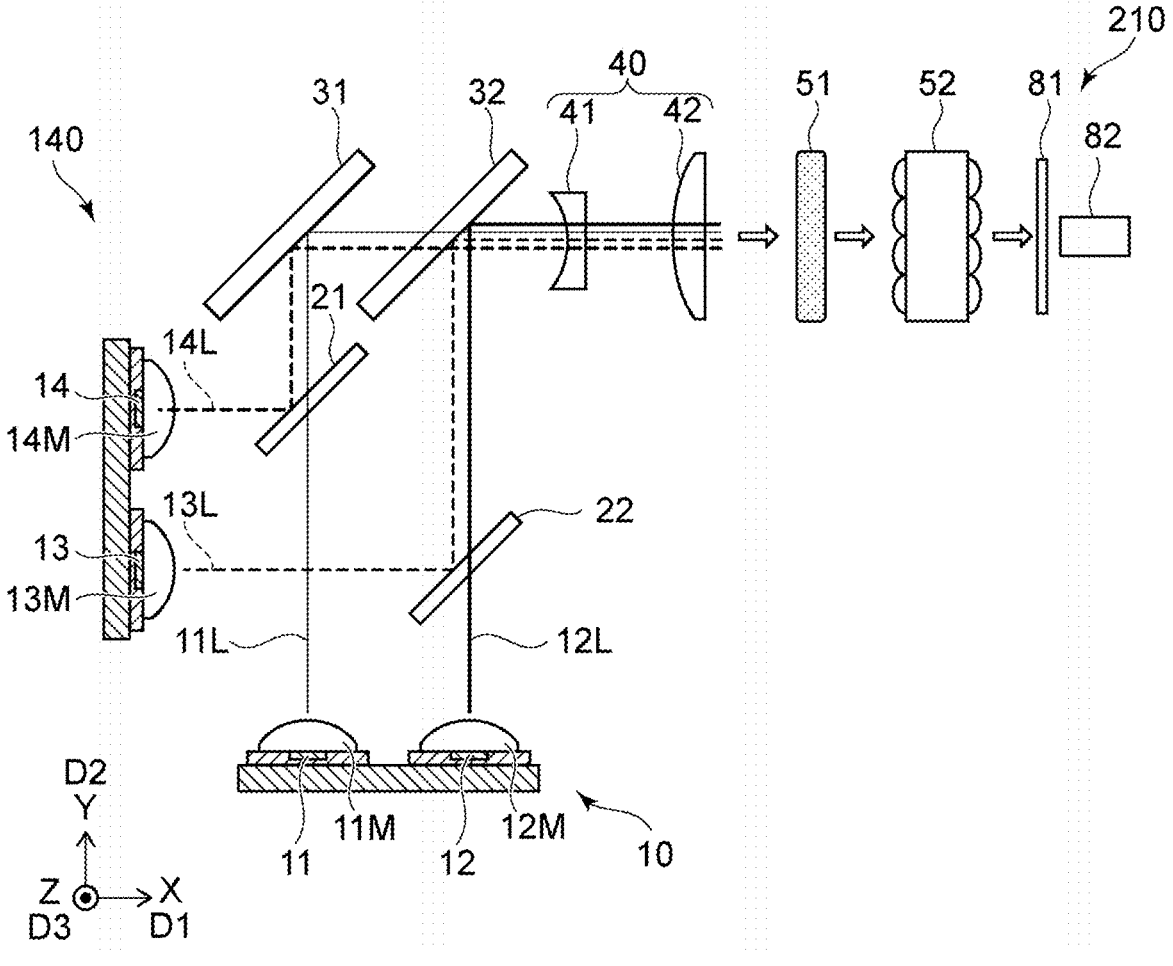
FIG. 17 schematically illustrates a plan view of a light source device according to a second embodiment.

FIG. 17 schematically illustrates a plan view of a light source device 140 and a display device 210 according to a second embodiment. As illustrated in FIG. 17, the light source device 140 according to the present embodiment includes a first optical member 21, a second optical member 22, and a light source unit 10. The light source unit 10 includes a first light source 11, a second light source 12, a third light source 13, and a fourth light source 14. The first light source 11 emits first laser light 11L with a first peak wavelength. The second light source 12 emits second laser light 12L. The second laser light 12L has a second peak wavelength different from the first peak wavelength. The third light source 13 emits third laser light 13L with the first peak wavelength. The fourth light source 14 emits fourth laser light 14L with the second peak wavelength.

The first laser light 11L passes through the first optical member 21. The second laser light 12L passes through the second optical member 22. The third laser light 13L is reflected by the second optical member 22. The fourth laser light 14L is reflected by the first optical member 21.

In the light source device 140, the arrangement of the light sources with different wavelengths is horizontally flipped between two modules of the light source unit 10. With such a configuration, uniform light is easily obtained. According to the present embodiment a light source device can be provided in which the speckles can be reduced.

In the light source device 140, the first laser light 11L having passed through the first optical member 21 is reflected by a first mirror 31 and then passes through the second mirror 32. The fourth laser light 14L having been reflected by the first optical member 21 is reflected by the first mirror 31 and then passes through a second mirror 32. The second laser light 12L having passed through the second optical member 22 is reflected by the second mirror 32. The third laser light 13L having been reflected by the second optical member 22 is reflected by the second mirror 32. These laser light beams pass through a light shaping member 40 and are further incident on a diffusion element 51.

Third Embodiment

The third embodiment relates to a display device. For example, a display device 210 (for example, see FIGS. 2 and 3) according to the present embodiment includes a light source device (the light source device 110 in the example illustrated in FIGS. 2 and 3) according to the first embodiment or the second embodiment and a control element 81. As described above, light emitted from the light source device 110 is incident on the control element 81. The display device 210 may include an imaging optical member 82. The imaging optical member 82 forms an image of light exiting the control element 81. The display device 210 is, for example, a projector. The display device 210 includes the light source device according to the first embodiment or the second embodiment, making it possible to provide a display device that can perform display of images with reduced speckles.

According to certain embodiments, a light source device and a display device can be provided in which the speckles are reduced.

In the present description, "perpendicular" includes not only strictly perpendicular but also, for example, a variation or the like in a manufacturing process and includes substantially perpendicular.

Certain embodiments of the present invention have been described above with reference to specific examples. However, the present invention is not limited to these specific examples. For example, regarding the specific configurations of each of a light source, a wavelength multiplexing member, an element, a mirror, and the like included in a light source device, as long as those skilled in the art can similarly practice the present invention by appropriately selecting from known art and obtain similar effects, such practice is included in the scope of the present invention.

The combination of any two or more components of the specific examples within the technical feasibility is included in the scope of the present invention, as long as the combination encompasses the gist of the present invention.

Moreover, all light source devices and display devices practicable by those skilled in the art with appropriate design modifications based on the above-described light source devices and display device as embodiments of the present invention are also within the scope of the present invention, as long as they encompass the gist of the present invention.

Various changes and modifications can be conceived by those skilled in the art within the spirit of the present invention, and it is understood that such changes and modifications are also included within the scope of the present invention.

What is claimed is:

1. A first optical member; a second optical member; a first light source configured to emit first laser light of a first peak wavelength; a second light source configured to emit second laser light of a second peak wavelength different from the first peak wavelength; a third light source configured to emit third laser light of a third peak wavelength different from the first peak wavelength and the second peak wavelength; a fourth light source configured to emit fourth laser light of the second peak wavelength; a fifth light source configured to emit fifth laser light of the third peak wavelength; a sixth light source configured to emit sixth laser light of the second peak wavelength; a seventh light source configured to emit seventh laser light of the first peak wavelength; and an eighth light source configured to emit eighth laser light of the second peak wavelength, wherein the first and fifth laser lights pass through the first optical member, the second and sixth laser lights pass through the second optical member, the third and seventh laser lights are reflected by the second optical member, and the fourth and eighth laser lights are reflected by the first optical member.

2. The light source device according to claim 1, wherein
the second peak wavelength is longer than the first peak wavelength, and
the first peak wavelength is longer than the third peak wavelength.

3. The light source device according to claim 1, wherein a direction from the first light source to the second light source is along a first direction, a direction from the third light source to the fourth light source is along a second direction intersecting the first direction, a direction from the fifth light source to the sixth light source is along the first direction, a direction from the seventh light source to the eighth light source is along the second direction, a direction from the fifth light source to the first light source is along a third direction intersecting a plane extending in the first direction and the second direction, a direction from the sixth light source to the second light source is along the third direction, a direction from the seventh light source to the third light source is along the third direction, and a direction from the eighth light source to the fourth light source is along the third direction.

4. The light source device according to claim 3, wherein the first laser light is emitted from the first light source in the second direction, the second laser light is emitted from the second light source in the second direction, the third laser light is emitted from the third light source in the first direction, the fourth laser light is emitted from the fourth light source in the first direction, the fifth laser light is emitted from the fifth light source in the second direction, the sixth laser light is emitted from the sixth light source in the second direction, the seventh laser light is emitted from the seventh light source in the first direction, and the eighth laser light is emitted from the eighth light source in the first direction.

5. The light source device according to claim 3, wherein
a plurality of the first light sources is arranged in the third direction, and
a plurality of the third light sources is arranged in the third direction.

6. The light source device according to claim 1, wherein
a distance between the first light source and the third light source is shorter than a distance between the first light source and the fourth light source, and is shorter than a distance between the second light source and the third light source.

7. The light source device according to claim 1, wherein
a distance between the second light source and the fourth light source is shorter than a distance between the second light source and the third light source, and is shorter than a distance between the first light source and the fourth light source.

8. The light source device according to claim 1, further comprising a first mirror and a second mirror, wherein
the first laser light having passed through the first optical member and the fourth laser light having been reflected by the first optical member are reflected by the first mirror and then pass through the second mirror,
the second laser light having passed through the second optical member and the third laser light having been reflected by the second optical member are reflected by the second mirror,
the fifth laser light having passed through the first optical member and the eighth laser light having been reflected by the first optical member are reflected by the first mirror and then pass through the second mirror, and
the sixth laser light having passed through the second optical member and the seventh laser light having been reflected by the second optical member are reflected by the second mirror.

9. The light source device according to claim 8, further comprising a light shaping member, wherein
the first and fourth laser lights having passed through the second mirror, the second and third laser lights having been reflected by the second mirror, the fifth and eighth laser lights having passed through the second mirror, and the sixth and seventh laser lights having been reflected by the second mirror, pass through the light shaping member.

10. The light source device according to claim 9, further comprising a diffusion element, wherein
each of the first, second, third, fourth, fifth, sixth, seventh, and eighth laser lights having exited the light shaping member is incident on the diffusion element.

11. The light source device according to claim 10, further comprising a fly-eye lens, wherein
each of the first, second, third, fourth, fifth, sixth, seventh, and eighth laser lights having exited the diffusion element passes through the fly-eye lens.

12. The light source device according to claim 1, further comprising a first mirror and a second mirror, wherein the second laser light having passed through the second optical member and the third laser light having been reflected by the second optical member are reflected by the first mirror and then pass through the second mirror, the first laser light having passed through the first optical member and the fourth laser light having been reflected by the first optical member are reflected by the second mirror, the sixth laser light having passed through the second optical member and the seventh laser light having been reflected by the second optical member are reflected by the first mirror and then pass through the second mirror, and the fifth laser light having passed through the first optical member and the eighth laser light having been reflected by the first optical member are reflected by the second mirror.

13. The light source device according to claim 12, further comprising a light shaping member, wherein the second and third laser lights having passed through the second mirror, the first and fourth laser lights having been reflected by the second mirror, the sixth and seventh laser lights having passed through the second mirror, and the fifth and eighth laser lights having been reflected by the second mirror, pass through the light shaping member.

14. The light source device according to claim 1, further comprising: a first sealing member sealing the first light source and the fifth light source; a second sealing member sealing the second light source and the sixth light source; a third sealing member sealing the third light source and the seventh light source; and a fourth sealing member sealing the fourth light source and the eighth light source, wherein the first sealing member, the second sealing member, the third sealing member, and the fourth sealing member are spaced apart from each other.

15. The light source device according to claim 1, wherein the first, second, fifth, and sixth light sources are included in a first light source module and directed to a first direction, and the third, fourth, seventh, and eighth light sources are included in a second light source module separate from the first light source module and directed to a second direction intersecting the first direction.

16. A display device comprising: the light source device according to claim 1; a control element positioned to receive light emitted from the light source device; and an imaging optical member configured to form an image of light exiting the control element.

17. A light source device comprising:

a first optical member;

a second optical member;

a first light source configured to emit first laser light of green;

a second light source configured to emit second laser light of red;

a third light source configured to emit third laser light of blue;

a fourth light source configured to emit fourth laser light of red;

a fifth light source configured to emit fifth laser light of blue;

a sixth light source configured to emit sixth laser light of red;

a seventh light source configured to emit seventh laser light of green; and an eighth light source configured to emit eighth laser light of red, wherein the first and fifth laser lights pass through the first optical member, the second and sixth laser lights pass through the second optical member, the third and seventh laser lights are reflected by the second optical member, and the fourth and eighth laser lights are reflected by the first optical member.

18. A display device comprising: the light source device according to claim 17; a control element positioned to receive light emitted from the light source device; and an imaging optical member configured to form an image of light exiting the control element.

* * * * *